(12) United States Patent
Ezaki et al.

(10) Patent No.: US 8,778,068 B2
(45) Date of Patent: Jul. 15, 2014

(54) W/O EMULSION INK FOR INKJET

(75) Inventors: Naofumi Ezaki, Tokyo (JP); Shinichiro Shimura, Tokyo (JP); Kazuyuki Ando, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 258 days.

(21) Appl. No.: 13/299,769

(22) Filed: Nov. 18, 2011

(65) Prior Publication Data

US 2012/0125227 A1    May 24, 2012

(30) Foreign Application Priority Data

Nov. 19, 2010  (JP) ................................ 2010-259351
Mar. 28, 2011  (JP) ................................ 2011-069893

(51) Int. Cl.
*C09D 11/02*    (2014.01)

(52) U.S. Cl.
USPC ..................................... 106/31.26; 106/31.25

(58) Field of Classification Search
USPC .......................................... 106/31.26, 31.25
See application file for complete search history.

(56) References Cited

U.S. PATENT DOCUMENTS

| | | | |
|---|---|---|---|
| 2009/0090270 A1* | 4/2009 | Okuda et al. | 106/31.26 |
| 2009/0196994 A1* | 8/2009 | Endo | 427/256 |
| 2009/0198003 A1 | 8/2009 | Endo | |
| 2010/0092676 A1* | 4/2010 | Uozumi et al. | 427/265 |

FOREIGN PATENT DOCUMENTS

| | | |
|---|---|---|
| CN | 101275044 A | 10/2008 |
| CN | 101376756 A | 3/2009 |
| JP | 2006-56931 A | 3/2006 |

\* cited by examiner

*Primary Examiner* — Veronica F Faison
(74) *Attorney, Agent, or Firm* — Fitch, Even, Tabin & Flannery LLP

(57) ABSTRACT

A water-in-oil (W/O) emulsion ink which is suitable for use in inkjet printing and superior in ejection performance and storage stability is provided. A polyglycerin fatty acid ester which fatty acid moiety is oleic acid or isostearic acid and which has an HLB value of 7-14, is used as an emulsifier. The polyglycerin fatty acid ester preferably has a glycerin polymerization degree of 4-20 and preferably contains 1-3 fatty acids per one molecule thereof. The polyglycerin fatty acid ester has an organic value of preferably 550-2300 and an inorganic value of preferably 600-2500. Preferably, the emulsion ink comprises 40-99 mass % of the oil phase and 60-1 mass % of the water phase, and comprises 0.5-40 mass % of the polyglycerin fatty acid ester relative to the total amount of the ink. The water phase may contain a dye and optionally a solubilizer such as an amine based surfactant.

13 Claims, No Drawings

W/O EMULSION INK FOR INKJET

This U.S. application claims the foreign priority filing date benefit of Japanese Application JP2011-069893, filed Mar. 28, 2011, and Japanese Application JP 2010-259351, filed Nov. 19, 2010, and the full disclosure of each said Japanese application is incorporated herein by reference.

TECHNICAL FIELD

The present invention relates to a water-in-oil (W/O) emulsion ink which is suitable for use in inkjet printing and is superior in ejection performance and storage stability.

BACKGROUND ART

Inkjet printing is characterized by ejecting ink droplets from fine nozzles so as to perform non-contact printing. Companies have carried out R & D for inks for inkjet printing, aiming at making ink droplets finer and making printing speed faster and printing size larger.

As an ink used for inkjet printing (referred to as "ink for inkjet" in the present specification), an aqueous pigment or dye ink is generally used for personal and office uses. Because of high water-absorption of paper fibers, the aqueous pigment or dye ink exhibits high printing density thereon and is low in strike through which is a printing density looked from the backside of prints. On the other hand, since paper is dried under pressure during production, hydrogen bonds between the paper fibers are cut and cause curl when water contacts the paper. This curl is so remarkable as to influence accuracy of positioning of ink droplets and conveyance of paper when cut sheets of paper are used. It is prerequisite to eliminate the curl in order to achieve high speed printing.

As a technique for eliminating the curl, reducing the water content of the ink or removing water from the ink may be employed. In other words, oil based inks can be used to eliminate the curl, which are also suited for high speed printing.

Business printers which adopt a line head type inkjet system are noticed since they have the head fixed so as to produce a large amount of prints at high speed and are available at low price. An oil based pigment ink is usually used for this high speed inkjet printer. However, the ink permeates into the backside of paper after printing, and thus the resulting prints are low in printing density with lots of strike through, compared to printers adopting other systems.

Emulsifying an oil based ink with water to make a water-in-oil (W/O) emulsion ink is one of the methods for solving this problem (refer to Patent Document 1). Although a polyglycerin hydroxyl fatty acid ester with an HLB value of 3-5 is used as an emulsifier in the emulsion ink in Patent Document 1, ejection performance and storage stability are not always sufficient.

[Patent Document 1] JP-A-2006-56931

DISCLOSURE OF THE INVENTION

Problems to be Solved by the Invention

The object of the present invention is to provide a water-in-oil (W/O) emulsion ink which is suitable for inkjet printing and is superior in ejection performance and storage stability.

Means for Solving the Problem

As a result of diligent researches for the above mentioned object, the present inventors have found that a water-in-oil (W/O) emulsion ink superior in ejection performance and storage stability can be obtained by using a specific polyglycerin fatty acid ester as an emulsifier for the water-in-oil (W/O) emulsion ink, and have finally completed the present invention.

That is, according to the present invention, there is provided a water-in-oil (W/O) emulsion ink for inkjet which comprises a polyglycerin fatty acid ester as an emulsifier, in which the fatty acid moiety of the polyglycerin fatty acid ester comprises oleic acid or isostearic acid, and the polyglycerin fatty acid ester has an HLB value of 7-14.

Effect of the Invention

According to the present invention, a water-in-oil (W/O) emulsion ink superior in ejection performance and storage stability, is obtained because a specific polyglycerin fatty acid ester is used as an emulsifier for forming the water-in-oil (W/O) emulsion ink.

BEST MODE FOR CARRYING OUT THE INVENTION

Hereinafter, the present invention will be described in detail.

The water-in-oil (W/O) emulsion ink of the present invention is obtained by mixing an oil phase and a water phase so as to disperse the water phase as fine particles in the oil phase.

The oil phase is mainly composed of an organic solvent, a coloring agent and an emulsifier, but may contain other components if necessary.

Any of non-polar solvents and polar solvents may be used as an organic solvent. These solvents can be used alone or in combination of two or more on condition that they form a single phase.

As the non-polar solvent, petroleum based hydrocarbon solvents including naphthenic, paraffinic and isoparaffinic ones can be used. Concrete examples include dodecane and other aliphatic saturated hydrocarbons, "ISOPAR and EXXOL" (both trade names) available from Exxon Mobil Corporation, "AF solvents" (trade name) available from Nippon Oil Corporation, and "SUNSEN and SUNPAR" (both trade names) available from Japan Sun Oil, Ltd. These can be used alone or in combination of two or more.

As the polar solvent, ester solvents, alcohol solvents, fatty acid solvents and ether solvents can be used, for example. These can be used alone or in combination of two or more.

The ester solvents includes, for example, higher fatty acid esters having 5 or more, preferably 9 or more and more preferably 12 to 32 carbon atoms in one molecule. Examples include isodecyl isononate, isotridecyl isononate, isononyl isononate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, soybean oil methyl ester, soybean oil isobutyl ester, tall oil methyl ester, tall oil isobutyl ester, diisopropyl adipate, diisopropyl sebacate, diethyl sebacate, propylene glycol monocapric ester, trimethylolpropane tri-2-ethylhexanoic ester, and glycerol tri-2-ethylhexanoic ester.

The alcohol solvent includes, for example, aliphatic higher alcohols having 12 or more carbon atoms in one molecule.

Concrete examples include higher alcohols such as isomyristyl alcohol, isopalmityl alcohol, isostearyl alcohol, and oleyl alcohol.

The fatty acid solvent includes, for example, fatty acids having 4 or more, preferably 9-22 carbon atoms in one molecule. Examples include isononanoic acid, isomyristic, acid, hexadecanoic acid, isopalmitic acid, oleic acid, and isostearic acid.

Examples of the ether solvents include glycol ether solvents such as diethyleneglycol monobutyl ether, ethyleneglycol monobutyl ether, propyleneglycol monobutyl ether and propyleneglycol dibutyl ether, and acetate of glycol ethers.

As a coloring agent, any of dyes and pigments can be used. These can be used alone or in combination.

As the pigment, pigments generally used in the printing industry, including organic and inorganic pigments, can be used without any particular limitation. Examples thereof include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments. These pigments may be used alone or in combination of two or more.

As the dye, water-soluble dyes such as azo, anthraquinone and azine based dyes or oil-soluble dyes can be used.

The coloring agent is contained preferably in an amount of 0.01 to 20 mass % based on the total of the ink.

When a pigment is used as a coloring agent, it is preferable to add a pigment dispersing agent to the oil phase in order to make good dispersion of the pigment in the oil phase. The pigment dispersing agents used in the present invention are not particularly limited as long as they can stably disperse the pigment in a solvent. Examples thereof include a hydroxyl group-containing carboxylic acid ester, a salt of a long-chain polyaminoamide and a high-molecular-weight acidic ester, a salt of a high-molecular-weight polycarboxylic acid, a salt of a long-chain polyaminoamide and a polar acidic ester, a high-molecular-weight unsaturated acid ester, a high-molecular-weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Among these, polymer dispersing agents are preferable.

Concrete examples of the dispersing agents include "SOLSPERSE 5000 (phthalocyanine ammonium salt based), 13940 (polyester amine based), 17000, 18000 (aliphatic amine based), 11200, 22000, 24000, and 28000" (all trade names) available from Lubrizol Japan Ltd.; "EFKA 400, 401, 402, 403, 450, 451, 453 (modified polyacrylate), 46, 47, 48, 49, 4010, 4055 (modified polyurethane)" (all trade names) available from Efka Chemicals; "DEMOL P, EP, POIZ 520, 521, 530, HOMOGENOL L-18 (polycarboxylate polymer type surfactants)" (all trade names) available from Kao Corporation; "DISPARLON KS-860, KS-873N4 (polyester amine salt)" (both trade names) available from Kusumoto Chemicals, Ltd.; and "DISCOL 202, 206, OA-202, OA-600 (multichain polymeric nonionic based)" (all trade names) available from Daiichi Kogyo Seiyaku Co., Ltd.

The pigment dispersing agents may be contained in an amount sufficient to disperse the pigment in the oil phase, and can be set properly.

When a water-soluble dye is used as a coloring agent, it is dissolved in the internal water phase. In this instance, particle diameter of the internal water phase is preferably 80-500 nm. When it is smaller than 80 nm, surface density of prints may be lowered, and appearance of dye may be deteriorated. When it is larger than 500 nm, inkjet ejection performance may be deteriorated.

As an emulsifier, a polyglycerin fatty acid ester which fatty acid moiety comprises oleic acid or isostearic acid and which has an HLB value of 7-14 is used. The polyglycerin fatty acid ester herein means an esterification product of a polyglycerin with a fatty acid. When the polyglycerin fatty acid ester does not satisfy the above requirements of the present invention, ejection performance and storage stability are inferior. The fatty acid moiety is preferably isostearic acid because it greatly improves both ejection performance and storage stability.

The above polyglycerin fatty acid ester has a polyglycerin moiety with a glycerol polymerization degree of preferably 4-20 and more preferably 6-16 and has several (for example, 1-3) higher fatty acid moieties which are ester-bonded to one molecule of the above polyglycerin moiety. Also, the above polyglycerin fatty acid ester has an organic value of preferably 550-2300 and an inorganic value of preferably 600-2500. More preferably, it has an organic value of 600-1700 and an inorganic value of 600-1300. When the organic value is larger than 2300 or the inorganic value is larger than 2500, ink viscosity may become high. Preferred examples of the polyglycerin fatty acid ester include tetraglyceryl monooleate, hexaglyceryl monooleate, decaglyceryl trioleate, tetraglyceryl monoisostearate, hexaglyceryl monoisostearate and decaglyceryl diisostearate.

Meanwhile, the "organic value" and the "inorganic value" are based on the notion used in the "organic conception diagram" proposed by Atsushi Fujita, in which nature of organic compounds is categorized by two factors of "organic nature" derived from the chain of covalent bonds of carbon chains and "inorganic nature" derived from the influence of electrostatic properties in substituents (functional groups), and each factor is determined from the structure of compounds and converted to numerical values. Details of the "organic conception diagram" are described in "Systematic Qualitative Organic Analysis (Mixtures)", Atsushi Fujita et al., Kazama Shobo Co., Ltd. (1974).

HLB is a theoretical value calculated by the following equation.

$$HLB=[(\text{inorganic value}/\text{organic value})] \times 10$$

The amount of the emulsifier to be used in the present invention on solid mass basis is preferably 0.5 to 40 mass %, more preferably 1.0-30 mass %, and further more preferably 2.0-12 mass % based on the total amount of the ink. If it is less than 0.5 mass %, storage stability of emulsion may be lowered. Also, if it is more than 40 mass %, viscosity may become too high to be suitable for inkjet. In addition, the amount of the emulsifier to be used is preferably 5-70 mass % and more preferably 10-60 mass % relative to the amount of the oil phase.

The oil phase can be prepared, for example, by putting the whole or parts of the components in a known dispersing machine such as a beads-mill to obtain a dispersion and if necessary passing it through a known filtering machine like a membrane filter. For example, it can be prepared by obtaining a mixture of a part of the solvent and the whole of the pigment and pigment dispersing agent and uniformly dispersing them in a dispersing machine, and then adding the rest of the components to the dispersion followed by filtering.

The water phase is composed of water in which a water-soluble dye, a metal salt, an electrolyte, a moisturizing agent, a water-soluble polymer, an oil-in-water (O/W) emulsion of resin, a fungicide, an antiseptic, a pH controller, a freeze preventing agent or the like, may be dissolved if necessary.

When the water phase contains a water-soluble dye, the amount thereof to be blended is preferably 0.5-15 mass % and more preferably 1-10 mass % relative to the whole amount of the ink. When it is less than 0.5 mass %, surface printing density may not be improved. Also, when it is more than 15 mass %, ejection performance may be deteriorated.

When the water phase contains a water-soluble dye, a solubilizer is preferably added to the water phase. In this case, the dye which is dissolved at the molecular level permeates into and is adsorbed by paper fibers so that the coloring of the dye is improved. As the solubilizer, amine based surfactants are preferable. Examples of the amine based surfactant includes polyalkylene oxide adducts of organic amines such as ethylene oxides (EO) or propylene oxides (PO) adducts of alkyl amines, alkenyl amines, alkyl hydroxyl amines, alkenyl hydroxyl amines, oxyalkylamines, oxyalkenylamines or the like. Of these, ethylene oxides (EO) or propylene oxides (PO) adducts of alkyl amines are preferable. As such amine based surfactants, commercially available ones such as SOLSPERSE 20000, SOLSPERSE 27000, SOLSPERSE 46000 (all trade names) available from Lubrizol Japan Ltd., and TAMNO-15 (trade name) available from Nikko Chemical Corporation can be used. The amount to be blended of the solubilizer is preferably 0.1-10 mass % and more preferably 0.3-8 mass % relative to the total amount of the ink.

In order to lower the viscosity of the ink and thereby improve ejection performance, glycerin or diglycerin is preferably added to the water phase. The amount to be blended of glycerin or diglycerin is preferably 10-70 mass % and more preferably 20-65 mass % relative to the total amount of the ink. When it is less than 10 mass %, the effect of lowering viscosity is difficult to obtain, and when it is more than 70 mass %, ejection stability and storage stability may be deteriorated.

The water-in-oil (W/O) emulsion ink for inkjet according to the present invention can be produced by mixing and emulsifying the oil phase and the water phase. Emulsification can be conducted by previously preparing the water phase and the oil phase separately from each other, and then adding the water phase liquid to the oil phase liquid. Alternatively, emulsification can be conducted after the oil phase components are wholly or separately added to the water phase. A known emulsifying machine such as a disper mixer, a homomixer and the like can be used for the preparation.

The ink for inkjet according to the present invention comprises 40 to 99 mass % of an oil phase and 60 to 1 mass % of a water phase. A water-in-oil (W/O) emulsion is difficult to be formed if the percentage of the water phase exceeds 60 mass %. If the percentage of the water phase is below 1 mass %, printing density may lower or strike through may occur in prints. Generally, there is a tendency that the higher the percentage of the water phase is, the higher the viscosity of the ink becomes. Thus, a blending percentage of the two phases is preferably 50 to 98 mass % of the oil phase and 50 to 2 mass % of the water phase and more preferably 55 to 97 mass % of the oil phase and 45 to 3 mass % of the water phase.

The viscosity of the thus-obtained present water-in-oil (W/O) emulsion ink for inkjet at 23° C. is preferably set within the range from 3 to 100 mP·s, more preferably within the range from 5 to 30 mPa·s, and particularly preferably within the range from 10 to 20 mPa·s. The viscosity of the ink can be adjusted by controlling kinds and amounts of the components of the oil phase and amounts or contents of the water phase. Generally, there is a tendency that the lesser the amount of the water phase and/or emulsifier is, the lower the viscosity of the ink is, but also the lower the storage stability of emulsion is.

EXAMPLE

Hereinafter, the present invention will be described in detail by way of examples, however, the present invention is not limited to these examples.

Examples 1-13 and Comparative Examples 1-8

The pigment and dispersing agent in the amounts shown in Table 1 or Table 3 were mixed with a part of the solvent shown in the same Table, and the pigment was dispersed with a Rocking Mill (available from Seiwa Giken Co., Ltd.) to obtain a pigment dispersion. The pigment dispersion was diluted with the remaining solvent, and then a surfactant was dissolved therein to obtain the oil phase. A water-in-oil (W/O) emulsion ink was prepared by dropping an ion exchanged water or a mixture of an ion exchanged water with an additive into the oil phase under stirring at 5000 rpm using a high speed homogenizer "Physcotron" (trade name; available from MICROTEC CO., LTD.), and then continuing the stirring for 5 minutes at 20000 rpm. Meanwhile, the amount to be blended of each component in Table 1 and Table 3 is shown in part by mass.

Examples 14-29

A water-in-oil (W/O) emulsion ink was prepared in the same manner as above except that the oil phase was made by dissolving an emulsifier into the solvent shown in Table 2 and the water phase was made by diluting an aqueous solution containing a water-soluble dye and optionally a solubilizer with an ion exchanged water.

The inkjet inks obtained respectively in the above Examples and Comparative Examples were evaluated by the following methods. The evaluation results of these were shown in Tables 1-3.

(1) Ejection Performance

Evaluation was made by printing sheets of plain paper "RISO-YOSHI, Usukuchi" (trade name; manufactured by RISO KAGAKU CORPORATION) using a line-head type inkjet printer "ORPHIS HC5500" (trade name; manufactured by RISO KAGAKU CORPORATION) Misfiring of ink was observed after solid image was printed continuously on ten sheets of paper, and evaluated according to the following standards.

A: Mostly no misfiring, and almost the same image was printed on the first sheet and the tenth sheet.
B: Many misfiring, and the same image was not be printed on the first sheet and the tenth sheet.
C: Impossible to eject or too many misfiring to print solid image.

(2) Storage Stability

If the water-in-oil (W/O) emulsion ink is unstable, the moisture content in the upper portion of the ink decreases over time. The moisture content in the upper portion of the ink was measured, and compared with the charged amount of water upon preparation to evaluate storage stability. A water-in-oil (W/O) emulsion ink was placed in a 10 ml screw vial, left for 1 week in a thermostatic chamber at 70° C., and then the moisture content in the upper portion of the ink was measured. The ink was sampled from the upper portion of the vessel, and the moisture content was measured using Karl Fischer moisture titrator (701 type, available from Metrohm-Shibata Ltd.).

Residual ratio of moisture in the upper portion of ink (%) =

$$\frac{\text{Moisture content in the upper portion of ink (mass \%)}}{\text{Charged amount of water in ink (mass \%)}} \times 100$$

Stability was evaluated according to the following standards using as an indicator the residual ratio of moisture calculated by the above equation.
A: Residual ratio of moisture in the upper portion of ink is not less than 90%.
B: Residual ratio of moisture in the upper portion of ink is not less than 70% and less than 90%.
C: Residual ratio of moisture in the upper portion of ink is not less than 30% and less than 70%.
D: Residual ratio of moisture in the upper portion of ink is not less than 20% and less than 30%.
E: Residual ratio of moisture in the upper portion of ink is less than 20%.
ND: Not detected.

(3) Measuring Method for Particle Diameter of Internal Water Phase

Dynamic Light-scattering Particle Size Analyzer LB-500 (available from HORIBA, Ltd.) was used to measure median diameter.

(4) Evaluation Method of Surface Density of Prints

Solid image was printed on sheets of plain paper (RISO matt IJ (W) (trade name), available from RISO KAGAKU CORPORATION) using "ORPHIS HS5500". Evaluation of the surface density of prints was performed by measuring an OD value of a surface of the solid image using an optical densitometer (RD920, available from Macbeth).

(5) Measured Viscosity (mPas)

Rheometer AR-G2 (available from TA Instruments) was used to measure a viscosity (unit: mPas) of the ink when 10 Pa shear stress was applied onto the ink. Meanwhile, ND in Tables means "not determined".

TABLE 1

| | | | | | Emulsion property | | | | | | | | | | |
|---|---|---|---|---|---|---|---|---|---|---|---|---|---|---|---|
| | | | | Organic value | Inorganic value | HLB | Fatty acid moiety | Polymerization degree of glycerin | Example | | | | | | |
| | | | | | | | | | 1 | 2 | 3 | 4 | 5 | 6 | 7 |
| Composition of ink | Oil phase | Emulsifier | Tetraglyceryl monooleate | 600 | 622 | 10.4 | Oleic acid | 4 | 10.0 | | | | | | |
| | | | Hexaglyceryl monooleate | 720 | 862 | 12.0 | Oleic acid | 6 | | 10.0 | | | | | |
| | | | Decaglyceryl Trioleate | 1680 | 1266 | 7.5 | Oleic acid | 10 | | | 10.0 | | | | |
| | | | Tetraglyceryl monoisostearate | 590 | 620 | 10.5 | Isostearic acid | 4 | | | | 10.0 | | | |
| | | | Hexaglyceryl monoisostearate | 710 | 860 | 12.1 | Isostearic acid | 6 | | | | | 10.0 | | |
| | | | Decaglyceryl diisostearate | 1300 | 1300 | 10.0 | Isostearic acid | 10 | | | | | | 10.0 | 10.0 |
| | | Pigment | Carbon black (MA8) | | | | | | 10.0 | 10.0 | 10.0 | 10.0 | 10.0 | 10.0 | 10.0 |
| | | Dispersing agent | SOLSPERSE 28000 | | | | | | 3.3 | 3.3 | 3.3 | 3.3 | 3.3 | 3.3 | 3.3 |
| | | Organic solvent | AF SOLVENT No. 6 | | | | | | 56.7 | 56.7 | 56.7 | 56.7 | 56.7 | 56.7 | 44.7 |
| | | | Isononyl isononate | | | | | | | | | | | | 12.0 |
| | | | Dodecan | | | | | | | | | | | | |
| | Water Phase | Water | Ion exchanged water | | | | | | 20.0 | 20.0 | 20.0 | 20.0 | 20.0 | 20.0 | 20.0 |
| | | Additive | Glycerin | | | | | | | | | | | | |
| | | | Diglycerin | | | | | | | | | | | | |
| | Total (part) | | | | | | | | 100.0 | 100.0 | 100.0 | 100.0 | 100.0 | 100.0 | 100.0 |
| Evaluation | | | Ejection performance | | | | | | A | A | A | A | A | A | A |
| | | | Storage stability (70° C., 1 week) | | | | | | D | C | C | C | B | A | A |
| | | | Measured viscosity (mPas) | | | | | | ND | ND | ND | ND | ND | ND | ND |

| | | | | | Emulsion property | | | | | | | | | |
|---|---|---|---|---|---|---|---|---|---|---|---|---|---|---|
| | | | | Organic value | Inorganic value | HLB | Fatty acid moiety | Polymerization degree of glycerin | Example | | | | | |
| | | | | | | | | | 8 | 9 | 10 | 11 | 12 | 13 |
| Composition of ink | Oil phase | Emulsifier | Tetraglyceryl monooleate | 600 | 622 | 10.4 | Oleic acid | 4 | | | | | | |
| | | | Hexaglyceryl monooleate | 720 | 862 | 12.0 | Oleic acid | 6 | | | | | | |
| | | | Decaglyceryl Trioleate | 1680 | 1266 | 7.5 | Oleic acid | 10 | | | | | | |
| | | | Tetraglyceryl monoisostearate | 590 | 620 | 10.5 | Isostearic acid | 4 | | | | | | |
| | | | Hexaglyceryl monoisostearate | 710 | 860 | 12.1 | Isostearic acid | 6 | | | | | | |
| | | | Decaglyceryl diisostearate | 1300 | 1300 | 10.0 | Isostearic acid | 10 | 10.0 | 2.0 | 20.0 | 10.0 | 10.0 | 10.0 |
| | | Pigment | Carbon black (MA8) | | | | | | 10.0 | 10.0 | 5.0 | 10.0 | 10.0 | 10.0 |

TABLE 1-continued

|  |  |  |  |  |  |  |  |  |  |
|---|---|---|---|---|---|---|---|---|---|
|  | Dispersing agent | SOLSPERSE 28000 | 3.3 | 3.3 | 1.7 | 6.0 | 6.0 | 6.0 |
|  | Organic solvent | AF SOLVENT No. 6 | 29.7 | 79.7 | 33.3 | 54.0 | 54.0 | 54.0 |
|  |  | Isononyl isononate |  |  |  |  |  |  |
|  |  | Dodecan | 27.0 |  |  |  |  |  |
| Water Phase | Water | Ion exchanged water | 20.0 | 5.0 | 40.0 | 20.0 | 10.0 | 10.0 |
|  | Additive | Glycerin |  |  |  |  | 10.0 |  |
|  |  | Diglycerin |  |  |  |  |  | 10.0 |
|  | Total (part) |  | 100.0 | 100.0 | 100.0 | 100.0 | 100.0 | 100.0 |
| Evaluation |  | Ejection performance | A | A | A | A | A | A |
|  |  | Storage stability (70° C., 1 week) | A | A | A | A | A | A |
|  |  | Measured viscosity (mPas) | ND | ND | ND | 31.6 | 28.3 | 27.9 |

TABLE 2

| | | | | Emulsion property | | | | | | | | | |
|---|---|---|---|---|---|---|---|---|---|---|---|---|---|
| | | | | Organic value | Inorganic value | HLB | Fatty acid moiety | Polymerization degree of glycerin | Example | | | | |
| | | | | | | | | | 14 | 15 | 16 | 17 | 18 | 19 |
| Composition of ink | Oil phase | Emulsifier | Tetraglyceryl monooleate | 600 | 622 | 10.4 | Oleic acid | 4 | | | | | 10.0 | 10.0 |
| | | | Hexaglyceryl monooleate | 720 | 862 | 12.0 | Oleic acid | 6 | 10.0 | 10.0 | | | | |
| | | | Decaglyceryl Trioleate | 1680 | 1266 | 7.5 | Oleic acid | 10 | | | | | | |
| | | | Hexaglyceryl monoisostearate | 710 | 860 | 12.1 | Isostearic acid | 6 | | | 5.0 | 5.0 | | |
| | | | Tetraglyceryl monoisostearate | 590 | 620 | 10.5 | Isostearic acid | 4 | | | | | | |
| | | | Decaglyceryl monooleate | 960 | 1342 | 14.0 | Oleic acid | 10 | | | | | | |
| | | Organic solvent | AF SOLVENT No. 6 | | | | | | 70.0 | 67.5 | 75.0 | 72.5 | 70.0 | 67.5 |
| | Water Phase | Water | Ion exchanged water | | | | | | 15.0 | 15.0 | 15.0 | 15.0 | 15.0 | 15.0 |
| | | Water soluble dye | KST Black J-BL (solid matter) | | | | | | 5.0 | 5.0 | 5.0 | 5.0 | 5.0 | 5.0 |
| | | Solubilizer | SOLSPERSE 20000 | | | | | | | 2.5 | | 2.5 | | 2.5 |
| | | | SOLSPERSE 27000 | | | | | | | | | | | |
| | | | SOLSPERSE 44000 | | | | | | | | | | | |
| | | | SOLSPERSE 46000 | | | | | | | | | | | |
| | Total (part) | | | | | | | | 100.0 | 100.0 | 100.0 | 100.0 | 100.0 | 100.0 |
| Evaluation | | | Ejection performance | | | | | | A | A | A | A | A | A |
| | | | Surface OD value of prints | | | | | | 1.02 | 1.06 | 1.06 | 1.08 | 1.02 | 1.06 |
| | | | Internal water phase particle diameter (nm) | | | | | | 86 | 102 | 482 | 457 | 178 | 156 |
| | | | Storage stability (70° C., 1 week) | | | | | | C | ND | B | ND | ND | ND |

| | | | | Emulsion property | | | | | | | | | |
|---|---|---|---|---|---|---|---|---|---|---|---|---|---|
| | | | | Organic value | Inorganic value | HLB | Fatty acid moiety | Polymerization degree of glycerin | Example | | | | |
| | | | | | | | | | 20 | 21 | 22 | 23 | 24 |
| Composition of ink | Oil phase | Emulsifier | Tetraglyceryl monooleate | 600 | 622 | 10.4 | Oleic acid | 4 | 10.0 | 10.0 | 10.0 | 10.0 | 10.0 |
| | | | Hexaglyceryl monooleate | 720 | 862 | 12.0 | Oleic acid | 6 | | | | | |
| | | | Decaglyceryl Trioleate | 1680 | 1266 | 7.5 | Oleic acid | 10 | | | | | |
| | | | Hexaglyceryl monoisostearate | 710 | 860 | 12.1 | Isostearic acid | 6 | | | | | |
| | | | Tetraglyceryl monoisostearate | 590 | 620 | 10.5 | Isostearic acid | 4 | | | | | |
| | | | Decaglyceryl monooleate | 960 | 1342 | 14.0 | Oleic acid | 10 | | | | | |
| | | Organic solvent | AF SOLVENT No. 6 | | | | | | 69.5 | 65.0 | 67.5 | 67.5 | 67.5 |
| | Water Phase | Water | Ion exchanged water | | | | | | 15.0 | 15.0 | 15.0 | 15.0 | 15.0 |
| | | Water soluble dye | KST Black J-BL (solid matter) | | | | | | 5.0 | 5.0 | 5.0 | 5.0 | 5.0 |
| | | Solubilizer | SOLSPERSE 20000 | | | | | | 0.5 | 5.0 | | | |
| | | | SOLSPERSE 27000 | | | | | | | | 2.5 | | |
| | | | SOLSPERSE 44000 | | | | | | | | | 2.5 | |
| | | | SOLSPERSE 46000 | | | | | | | | | | 2.5 |

TABLE 2-continued

|  |  |  |  |  |  |  |  |
|---|---|---|---|---|---|---|---|
| Total (part) | | | | 100.0 | 100.0 | 100.0 | 100.0 | 100.0 |
| Evaluation | Ejection performance | | | A | A | A | A | A |
| | Surface OD value of prints | | | 1.05 | 1.05 | 1.09 | 1.06 | 1.10 |
| | Internal water phase particle diameter (nm) | | | 185 | 192 | 269 | 90 | 100 |
| | Storage stability (70° C., 1 week) | | | ND | ND | ND | ND | ND |

| | | | | Emulsion property | | | | | Example | | | | |
|---|---|---|---|---|---|---|---|---|---|---|---|---|---|
| | | | | Organic value | Inorganic value | HLB | Fatty acid moiety | Polymerization degree of glycerin | 25 | 26 | 27 | 28 | 29 |
| Composition of ink | Oil phase | Emulsifier | Tetraglyceryl monooleate | 600 | 622 | 10.4 | Oleic acid | 4 | | | | | |
| | | | Hexaglyceryl monooleate | 720 | 862 | 12.0 | Oleic acid | 6 | | | | | |
| | | | Decaglyceryl Trioleate | 1680 | 1266 | 7.5 | Oleic acid | 10 | 10.0 | 10.0 | | | |
| | | | Hexaglyceryl monoisostearate | 710 | 860 | 12.1 | Isostearic acid | 6 | | | | | |
| | | | Tetraglyceryl monoisostearate | 590 | 620 | 10.5 | Isostearic acid | 4 | | | 10.0 | 10.0 | |
| | | | Decaglyceryl monooleate | 960 | 1342 | 14.0 | Oleic acid | 10 | | | | | 10.0 |
| | | Organic solvent | AF SOLVENT No. 6 | | | | | | 70.0 | 67.5 | 70.0 | 67.5 | 70.0 |
| | Water Phase | Water | Ion exchanged water | | | | | | 15.0 | 15.0 | 15.0 | 15.0 | 15.0 |
| | | Water soluble dye | KST Black J-BL (solid matter) | | | | | | 5.0 | 5.0 | 5.0 | 5.0 | 5.0 |
| | | Solubilizer | SOLSPERSE 20000 | | | | | | | | | | |
| | | | SOLSPERSE 27000 | | | | | | | 2.5 | | 2.5 | |
| | | | SOLSPERSE 44000 | | | | | | | | | | |
| | | | SOLSPERSE 46000 | | | | | | | | | | |
| Total (part) | | | | | | | | | 100.0 | 100.0 | 100.0 | 100.0 | 100.0 |
| Evaluation | Ejection performance | | | | | | | | A | A | A | A | B |
| | Surface OD value of prints | | | | | | | | 1.03 | 1.08 | 0.98 | 1.05 | 1.05 |
| | Internal water phase particle diameter (nm) | | | | | | | | 348 | 329 | 217 | 245 | 330 |
| | Storage stability (70° C., 1 week) | | | | | | | | ND | ND | ND | ND | ND |

TABLE 3

| | | | | Emulsion property | | | | | Comparative Example | | | | |
|---|---|---|---|---|---|---|---|---|---|---|---|---|---|
| | | | | Organic value | Inorganic value | HLB | Fatty acid moiety | Polymerization degree of glycerin | 1 | 2 | 3 | 4 | 5 |
| Composition of ink | Oil phase | Emulsifier | Hexaglyceryl polyricinolate | — | — | — | Polyricinoleic acid | 6 | 10.0 | | | | |
| | | | Diglyceryl triisostearate | 1170 | 300 | 2.6 | Isostearic acid | 2 | | 10.0 | | | |
| | | | Decaglyceryl pentaoleate | 2400 | 1190 | 5.0 | Oleic acid | 10 | | | 10.0 | | |
| | | | Hexaglyceryl monomyristate | 640 | 860 | 13.4 | Myristic acid | 6 | | | | 10.0 | |
| | | | Hexaglyceryl monostearate | 720 | 860 | 11.9 | Stearic acid | 6 | | | | | 10.0 |
| | | | Hexaglyceryl monolaurate | 600 | 860 | 14.3 | Lauric acid | 6 | | | | | |
| | | | Decaglyceryl monocaprylate | 760 | 1340 | 17.6 | Caprylic acid | 10 | | | | | |
| | | | Decaglyceryl monolaurate | 840 | 1340 | 16.0 | Lauric acid | 10 | | | | | |
| | | Pigment | Carbon black (MA8) | | | | | | 10.0 | 10.0 | 10.0 | 10.0 | 10.0 |
| | | Dispersing agent | SOLSPERSE 28000 | | | | | | 3.3 | 3.3 | 3.3 | 3.3 | 3.3 |
| | | Organic solvent | AF SOLVENT No. 6 | | | | | | 56.7 | 56.7 | 56.7 | 56.7 | 56.7 |
| | Water phase | Water | Ion exchanged water | | | | | | 20.0 | 20.0 | 20.0 | 20.0 | 20.0 |
| Total (part) | | | | | | | | | 100.0 | 100.0 | 100.0 | 100.0 | 100.0 |
| Evaluation | Ejection performance | | | | | | | | B | C | B | C | C |
| | Storage stability (70° C., 1 week) | | | | | | | | D | E | D | E | E |

Emulsion property

TABLE 3-continued

| | | | | Organic value | Inorganic value | HLB | Fatty acid moiety | Polymerization degree of glycerin | Comparative Example | | |
|---|---|---|---|---|---|---|---|---|---|---|---|
| | | | | | | | | | 6 | 7 | 8 |
| Composition of ink | Oil phase | Emulsifier | Hexaglyceryl polyricinolate | — | — | — | Polyricinoleic acid | 6 | | | |
| | | | Diglyceryl triisostearate | 1170 | 300 | 2.6 | Isostearic acid | 2 | | | |
| | | | Decaglyceryl pentaoleate | 2400 | 1190 | 5.0 | Oleic acid | 10 | | | |
| | | | Hexaglyceryl monomyristate | 640 | 860 | 13.4 | Myristic acid | 6 | | | |
| | | | Hexaglyceryl monostearate | 720 | 860 | 11.9 | Stearic acid | 6 | | | |
| | | | Hexaglyceryl monolaurate | 600 | 860 | 14.3 | Lauric acid | 6 | 10.0 | | |
| | | | Decaglyceryl monocaprylate | 760 | 1340 | 17.6 | Caprylic acid | 10 | | 10.0 | |
| | | | Decaglyceryl monolaurate | 840 | 1340 | 16.0 | Lauric acid | 10 | | | 10.0 |
| | | Pigment | Carbon black (MA8) | | | | | | 10.0 | 10.0 | 10.0 |
| | | Dispersing agent | SOLSPERSE 28000 | | | | | | 3.3 | 3.3 | 3.3 |
| | | Organic solvent | AF SOLVENT No. 6 | | | | | | 56.7 | 56.7 | 56.7 |
| | Water phase | Water | Ion exchanged water | | | | | | 20.0 | 20.0 | 20.0 |
| | Total (part) | | | | | | | | 100.0 | 100.0 | 100.0 |
| Evaluation | | | Ejection performance | | | | | | C | C | C |
| | | | Storage stability (70° C., 1 week) | | | | | | E | E | E |

Symbols for raw materials shown in Tables 1-3 mean as follows:

Carbon black MA-8 (trade name): Carbon black available from Mitsubishi Chemical Corporation.

SOLSPERSE 28000: Pigment dispersing agent SOLSPERSE 28000 (trade name) available from Lubrizol Japan Ltd.

AF SOLVENT No. 6 (trade name): Petroleum based hydrocarbon solvent available from Nippon Oil Corporation.

KST Black J-BL (trade name): An aqueous solution of water-soluble dye available from Nippon Kayaku Co., Ltd.

SOLSPERSE 20000: Amine based surfactant SOLSPERSE 20000 (trade name) available from Lubrizol Japan Ltd.

SOLSPERSE 27000: Amine based surfactant SOLSPERSE 27000 (trade name) available from Lubrizol Japan Ltd.

SOLSPERSE 44000: Amine based surfactant SOLSPERSE 44000 (trade name) available from Lubrizol Japan Ltd.

SOLSPERSE 46000: Amine based surfactant SOLSPERSE 46000 (trade name) available from Lubrizol Japan Ltd.

From the results of Table 1, it has been found that not only ejection performance but also storage stability are improved by using a polyglycerin fatty acid ester satisfying all the requirements of the present invention as an emulsifier as in the inks of Examples 1-13 that contained a pigment in the oil phase. Also, as shown by the comparison between Examples 11 and Examples 12 or 13, it has been found that when glycerin or diglycerin is added to the water phase, viscosity of the ink is lowered.

Similarly, from the result of Table 2, it has been found that ejection performance is improved by using a polyglycerin fatty acid ester satisfying all the requirements of the present invention as an emulsifier as in the inks of Examples 14-28 that contained a dye in the water phase. Also, as shown in the results of Table 2, it has been found that when a particle diameter of the internal water phase is 80-500 nm, the surface density of prints becomes high. Further, it has been found that when a solubilizer is added to the water phase, the surface density of prints is improved.

In contrast, the followings have been found from the result of Table 3.

In Comparative Example 1 in which a hexaglyceryl polyricinolate which is said to be good in ejection performance and storage stability in the above Patent Document 1 was used as an emulsifier for the emulsion ink, inkjet ejection performance was insufficient, and also storage stability at high temperature was inferior.

In Comparative Examples 2-3 in which a polyglycerin fatty acid ester having an HLB value of less than 7 was used as an emulsifier, both ejection performance and storage stability were inferior.

In Comparative Examples 4-8 in which a polyglycerin fatty acid ester which had a fatty acid moiety other than isostearic acid or oleic acid was used as an emulsifier, both ejection performance and storage stability were inferior.

INDUSTRIAL APPLICABILITY

Since the water-in-oil (W/O) emulsion ink for inkjet according to the present invention is excellent in ejection performance and storage stability, it can be used as an ink in the field of inkjet printing, particularly for business printers which adopt the line head type inkjet system.

The invention claimed is:

1. A water-in-oil (W/O) emulsion ink for inkjet, which comprises a polyglycerin fatty acid ester as an emulsifier, in which the fatty acid moiety of the polyglycerin fatty acid ester is isostearic acid, and the polyglycerin fatty acid ester has an HLB value of 7-14 and a glycerin polymerization degree of 6-16.

2. The water-in-oil (W/O) emulsion ink for inkjet according to claim 1, wherein 1-3 fatty acids are added to one molecule of the polyglycerin fatty acid ester.

3. The water-in-oil (W/O) emulsion ink for inkjet according to claim 2, wherein the polyglycerin fatty acid ester has an organic value of 550-2300 and an inorganic value of 600-2500.

4. The water-in-oil (W/O) emulsion ink for inkjet according to claim 3, which comprises 0.5-40 mass % of the polyglycerin fatty acid ester relative to the total amount of the ink.

5. The water-in-oil (W/O) emulsion ink for inkjet according to claim 1, which comprises glycerin or diglycerin in the water phase.

6. The water-in-oil (W/O) emulsion ink for inkjet according to claim 1, which comprises a dye in the water phase, in which the water phase has a particle diameter of 80-500 nm.

7. The water-in-oil (W/O) emulsion ink for inkjet according to claim 6, which comprises a solubilizer in the water phase.

8. The water-in-oil (W/O) emulsion ink for inkjet according to claim 7, in which the solubilizer is an amine based surfactant.

9. The water-in-oil (W/O) emulsion ink for inkjet according to claim 8, in which the amine based surfactant is a polyalkylene oxide adduct of an organic amine.

10. The water-in-oil (W/O) emulsion ink for inkjet according to claim 1, wherein the polyglycerin fatty acid ester has an HLB value of 10 to 14.

11. The water-in-oil (W/O) emulsion ink for inkjet according to claim 1, wherein the polyglycerin fatty acid ester has an HLB value of 10.

12. The water-in-oil (W/O) emulsion ink for inkjet according to claim 1, wherein the polyglycerin fatty acid ester has an HLB value of 10.5.

13. The water-in-oil (W/O) emulsion ink for inkjet according to claim 1, wherein the polyglycerin fatty acid ester has an HLB value of 12.1.

* * * * *